United States Patent [19]
Mallofré

[11] Patent Number: 5,156,000
[45] Date of Patent: Oct. 20, 1992

[54] LOW TEMPERATURE STARTING SYSTEM FOR INTERNAL COMBUSTION ENGINES

[76] Inventor: Salvador G. Mallofré, Valencia 7-A, 70, 08015-Barcelona, Spain

[21] Appl. No.: 692,686

[22] Filed: Apr. 29, 1991

[30] Foreign Application Priority Data

May 4, 1990 [ES] Spain ................... 9001257

[51] Int. Cl.$^5$ ............................. F02B 37/00
[52] U.S. Cl. ..................... 60/612; 123/559.1
[58] Field of Search .......... 60/612; 123/179.3, 179.17, 123/179.18, 179.31, 559.1

[56] References Cited

U.S. PATENT DOCUMENTS

| | | | |
|---|---|---|---|
| 1,736,132 | 11/1929 | Rippingille | 123/559.1 X |
| 3,427,802 | 2/1969 | Ruoff | 60/612 X |
| 4,232,521 | 11/1980 | Mallofre | 60/612 |
| 4,781,028 | 11/1988 | Zoche | 62/612 |
| 5,033,439 | 7/1991 | Eygret | 123/179.17 |

FOREIGN PATENT DOCUMENTS 851317 10/1960 United Kingdom ............... 60/612

Primary Examiner—Michael Koczo
Attorney, Agent, or Firm—Mcaulay Fisher Nissen Goldberg & Kiel

[57] ABSTRACT

The system is based on incorporating a start turbocompressor capable of injecting pressurized air in the inlet manifold of the motor. The turbocompressor is driven by air supplied by a storage reservoir and starts operating after an air starter motor has been actuated. Operation is continued until, as a result of the ignition of the fuel, the engine attains a high speed, after which the starter motor and the turbocompressor are disengaged, whereby the engine decelerates. When the engine reaches a preset low speed, the turbocompressor is reengaged and stages of operation of the turbocompressor coinciding with engine acceleration alternate with inoperative stages coinciding with engine deceleration until an engine speed above the low speed is maintained. An electronic sequencer controls the successive operations.

11 Claims, 4 Drawing Sheets

LOW TEMPERATURE STARTING SYSTEM FOR INTERNAL COMBUSTION ENGINES

BACKGROUND OF THE INVENTION

1. Field of the Invention

The invention relates to a low temperature starting system for internal combustion engines, comprising: cylinders within which a fuel may be burnt and which produces combustion gases; pistons, each of which is housed in one of said cylinders; a crankshaft coupled to said pistons; a flywheel mounted to said crankshaft; a ring gear attached to and coaxial with said flywheel; an air inlet manifold; inlet valves associating said inlet manifold with each of said cylinders; an exhaust manifold for said combustion gases; exhaust valves associating said exhaust manifold with each of said cylinders; a turbocharger feeding said inlet manifold and which is driven by said combustion gases; a cooling radiator adapted to be inserted in said inlet manifold; an air starter motor adapted to drive said ring gear; means for supplying air to said air starter motor for actuation thereof; a fuel pump adapted to attain different frequency rates; and means for reading the speed of rotation of said crankshaft.

2. Prior Art

In Spanish patent no. 464.585 and the corresponding U.S. Pat. No. 4,232,521, the present applicant disclosed a process and a system for starting internal combustion engines. This process and system solve the problem of starting a supercharged engine, by overcoming the inoperativeness of the turbo blower supercharging the engine by applying a sufficient precompression to achieve starting without difficulty. This precompression is achieved by injecting compressed air from the outside and the injection is effected by the inclusion of an independent turbo blower unit, the outlet of which is connected to the engine inlet manifold.

The system referred to above, nevertheless, is of reduced efficiency for starting engines subjected to glacial temperatures, whereby there is evidenced the interest that exists in being able to provide all engines that have to operate under adverse weather conditions with the necessary conditions for a reliable start up.

For all vehicles parked outside or under scarcely protected covers in Arctic or continental areas subject to sharp temperature drops there is the risk of it being impossible to start the diesel engine after one of such drops.

The most important open cast mine workings, as well as the largest road haulers, have warning winkers installed at the regular motor vehicle parking lots, to advise of the need not to switch the engines off when the weather forecast so advises.

This means that, at certain heights or latitudes, the engines are left running, or ticking over for most of the time (i.e., an engine running at low speed ), for months on end (sometimes all winter).

This no-load running not only means a significant fuel consumption but also, because of the sulphur content of the present Diesel fuels, when the engine is ticking over (engine running at a low speed) at a relatively low temperature, causes the combustion products to condense in fine droplets of dilute sulphuric acid causing rapid wear of the cylinders, rings and pistons, dramatically shortening the working life of engines subjected to such conditions.

Furthermore, a vehicle with its engine running all night long may be highly polluting for the environment, both because of the fumes and because of the noise, in the case of vehicles parked near motels or residential areas.

It frequently happens that, to avoid such pernicious effects, an attempt is made to avoid extended no-load running as much as possible, which means that the user tends to refrain from connecting the alarm signal within the limits deemed to be prudent.

Nevertheless, in continental climates, sharp temperature drops are common and these, in the best of cases, may cause urgent mobilization of the personnel in the early hours of the morning to set the engines of a fleet running and, in the worst of cases, it may mean complete or partial blockage of a fleet for hours or even days.

In view of this situation, is is an aim of the invention to provide a system which allows an engine to be stopped as long as possible, while ensuring the immediate availability thereof at all times.

SUMMARY OF THE INVENTION

This aim is achieved with a system of the type indicated at the beginning which is characterized in that it comprises: a start turbocompressor drivable by air supplied by said supply means; a first port allowing the passage of air from said inlet manifold to said start turbocompressor; a first valve for opening and closing said first port; a second port discharging air from said start turbocompressor to said inlet manifold towards said cylinders; a second valve for opening and closing said port; a throttle valve for opening and closing said inlet manifold, said throttle valve being closed when said first and second valves are open and being open when said first and second valves are closed; and regulating means adapted to receive signals from said reading means and which, in turn, comprise: first control means for said air supply means relative to said automatic starter motor; second air supply control means relative to said start turbocompressor; third fuel injection and, consequently, engine rotation speed control means; and fourth control means for said first and second valves and said throttle valve.

By means of the system of the invention, on the basis of the engine temperature, ambient temperature and available air pressure information, it is possible to start a diesel engine automatically and not stop it again until the compressed air reservoir is refilled and the engine has become reasonably warm to allow for a sufficiently long subsequent stoppage.

BRIEF DESCRIPTION OF THE DRAWINGS

Further advantages and features of the invention will be appreciated from the following description in which preferred embodiments of the invention are described without any limiting nature, with reference to the accompanying drawings in which show.

DETAILED DESCRIPTION OF THE PREFERRED EMBODIMENTS

Figure 1:
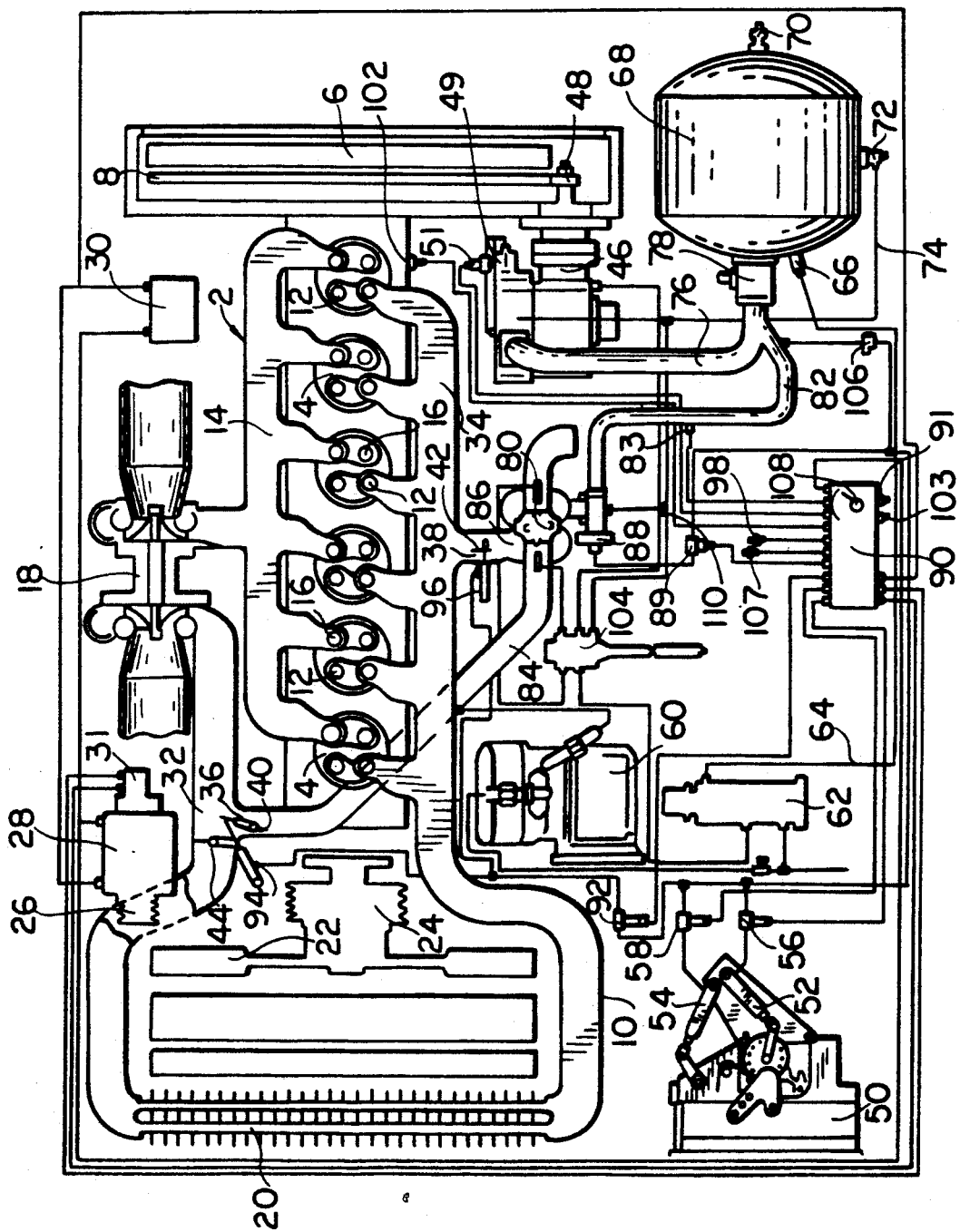
FIG. 1, is a schematic illustration of one embodiment of an internal combustion engine incorporating the low temperature starting system of the present invention.

An engine 2, in a known way, comprises cylinders 4 in which a fuel is burnt and such combustion generates combustion gases. Pistons 5 reciprocate in said cylinders, producing successive compressions and decompressions. Each of the pistons is associated with a crankshaft which is, in turn, attached to a flywheel 6, disposed coaxially and fixedly attached to a ring gear 8. There is an air inlet manifold 10 and inlet valves 12 place the inlet manifold 10 in communication with each cylinder. An exhaust manifold 14 collects the combustion gases and exhaust valves 16 place the cylinders 4 in communication with the exhaust manifold 14. The inlet manifold 10 receives air from a turbocharger 18 which is driven by the exhaust gases in the exhaust while the engine is running.

Inserted in the inlet manifold 10 there is a cooling radiator 20 on which air is blown by a fan 22 which, through a set of pulleys 24, 26 and a not shown belt, drives a generator 28 adapted to charge a battery 30.

In the embodiment illustrated in FIG. 1, the generator 28 moves a tachymetric dynamo 31 capable of providing a reading of the speed of rotation of the crankshaft. The insertion of the radiator forms a first manifold portion 32 comprised between the radiator and the turbocharger 18 and a second manifold portion 34 comprised between the radiator 20 and the cylinders 4. The invention contemplates that the first portion 32 should have a first port 36 and that the second portion 34 should have a second port 38, which may be opened or closed by a first prefeed valve 40 and a second prefeed valve 42, respectively. There is also a throttle valve 44 for closing or opening the first manifold portion 32 and the valve 44 is situated between first port 36 and the radiator 20. Further mention will be made of these manifold portions and these valves hereinafter.

The engine also comprises an air starter motor 46 having a drive pinion 48 capable of meshing with the ring gear 8 fixedly attached to the flywheel 6. The starter motor 46 is provided with a first servo-valve 49 driven in turn by a solenoid valve 51. The servo-valve 49 drives the drive pinion 48 at the same time. There is, furthermore, a fuel pump 50, the frequency of which may be set to different rates, in which the fuel injected in the cylinder combustion chambers is varied. With regard to the said fuel pump 50, it should be stated that there is a fuel air cylinder 52 and a stop cylinder 54 which are respectively controlled by a third fuel supply solenoid valve 56 and a stop solenoid valve 58.

A brake air compressor 60 is connected to a recompressor 62. When started up the recompressor 62 compresses the air through a passage 64 and a check valve 66, in an storage reservoir 68, protected by a safety valve 70 against possible excess pressure levels and provided with an automatic purge device 72, associated with an automatic purge activator line 74. Between the storage reservoir 68 and the air starter motor 46 there is at least one first pressurized air pipe 76 at the front end of which there is a preferably hand-operated valve 78.

According to the invention, the start system is provided with a start turbocompressor 80 which is driven by the pressurized air flowing from the storage reservoir 68. The communication between the storage reservoir 68 and the turbocompressor 80 is effected by a second pipe 82 which is, preferably, a branch of the first pipe 76. The pressure in the turbocompressor 80 is controlled by a starting air pressure sensor 83.

The start turbocompressor 80 is placed in communication with said first port 36 (and, therefore, with said first manifold portion 32) by an access pipe 84 which, for a better understanding of the invention, has been illustrated broken. It in turn is in communication with said second manifold portion 34 over a prefeed, pipe 86. The pressurized air flow to the turbocompressor 80 is control by a second servovalve valve 88, connected to a turbocompressor solenoid valve 89.

The system also comprises an electronic sequencer 90 which is provided with a timer, not shown, adapted to issue time-dependent commands, as well as a pushbutton 91. The sequencer 90 is connected to the tachymetric dynamo 31, whereby it receives information concerning the speed of rotation of the engine crankshaft. It is also connected to the said first servo valve 49, second servovalve 88 and third solenoid valve 56 and with a fourth servovalve 92 which, in turn, is capable of driving the air cylinders 94 and 96 which respectively drive the throttle valve 44, together with the first and second prefeed valves 40 and 42. The system also comprises an ambient temperature sensor 98, an oil temperature sensor 107 and a coolant temperature sensor 102. A stop pushbutton 103 and a selector 108 also form part of the sequencer 90.

In turn, a spray device 104 is capable of generating a lubricant mist which an air device 110 distributes for supply to the parts of the system requiring lubrication. Furthermore, an air pressure regulator 106 supplies the valves 56, 58, 89 and 92.

For operation of the start system, it is desirable to carry out, in the first place, a first charge of compressed air by setting the recompressor 62 running. In this way, the air is compressed in the storage reservoir 68 through the pipe 64 and valve 66. As said above, the reservoir is protected against overloads by the safety valve 70. Once the reservoir 68 has been pressurized, the valve 78 supplying the pipes 76 and 82 leading respectively to the air starter motor 46 and turbocompressor 80 is opened by hand. When the valve 78 is closed again, the pressure level in the said pipes 76 and 82 may easily be controlled by the pressure reading provided by the sequencer 90. This reading informs on the degree of airtightness of the members pressurized through the pipes 76 and 82. After this check and, as the case may be, any correction of the airtightness of the pressurized pipes, the valve 78 is left open so as to be able to start the engine 2.

For start up under moderate temperatures, the pushbutton 91 is pressed, activating the third solenoid valve 56, whereby the fuel pump 50 is set to high frequency rate by way of the air cylinder 52. At the same time the solenoid valve 51 is activated causing the drive pinion 48 to mesh with the ring gear 8 of the flywheel 6 through the intermediary of the first servovalve 49 and thereafter the air starter motor 46 is activated to cause the ring gear 8 to rotate rapidly for starting the engine 2.

Once the engine has started, an appropriate current tap from the tachymetric dynamo 31 signals to the electronic sequencer 90 that the crankshaft and, therefore, the engine 2 has reached the desired speed. This information causes the sequencer to disconnect the the solenoid valve 51, whereby the pinion 48 is disengaged and the starter motor 46 stops. At the same time the third solenoid valve 56 is de-energized, whereby the cylinder 52 leaves the fuel pump rotating at a slow rate.

Substantial changes occur in the system when the engine has to be started under glacial temperatures. If, when the pushbutton 91 is depressed, any of the ambient temperature sensor 98, lubricant sensor 100 or coolant temperature sensor 102 marks a temperature below a preset limit for each type of engine (depending mainly on the compression ratio), or, on the other hand, the weighted sum of these measurements reaches too low a limit, which has also been preset, the electronic sequencer 90 initiates a supercharged start-up operation, as described below.

The pushbutton 91 is depressed, whereby the sequencer energizes the third solenoid valve 56 which sets the engine fuel supply pump 50 to the high frequency rate by means of the air cylinder 52. The solenoid valve 51 is also energized through the first servovalve 49, whereby the drive pinion 48 meshes with the ring gear 8. When the starter motor 46 starts, it drives the crankshaft and the engine 2 while accelerating rapidly to its speed of rotation.

When the said speed reading means (formed by the tachymetric dynamo 31) signals to the electronic sequencer 90 that a preset speed of rotation of the crankshaft (about ⅓ of the maximum crankshaft speed) has been reached, the sequencer 90 activates the preturbine solenoid valve 89 which opens the second servovalve 88. In this way the start preturbine 80 is supplied and at the same time the fourth solenoid valve 92 closes the throttle valve 44 and opens the first valve 40 (by means of the air cylinder 94) and the second prefeed valve 42 (by means of the air cylinder 96). In view of the above, sole direct communication is established between the impeller of the turbocharger 18 and the suction member of the turbocompressor 80. The turbocompressor preturbine 80 supercharges the cylinders 4 of the engine 2 through the inlet manifold 10 and the cylinder inlet valves 12 at a time when the speed of rotation already acquired by the engine 2 is sufficient to overcome, by the inertia of the flywheel 6 thereof, the great power increase required to perform the corresponding compression stroke. This operation of the preturbine and supercharging of the cylinders is determined by the sequencer 90 on knowing the said speed of rotation.

At the same time, the rise in temperature in the cylinders 4, caused by the increase of the compression ratio, causes ignition of the fuel which has been injected into the cylinder combustion chambers, whereby the crankshaft, and the engine itself, accelerate rapidly. This higher speed of rotation is read by the dynamo 31, whereby the pinion 48 is disengaged from the starter motor by way of the sequencer 90 and solenoid valve 51 and the starter motor stops.

In spite of the fact that the high speed of rotation reached by the crankshaft may require a suction flowrate surpassing the maximum flowrate that the turbocompressor 80 can provide the agitation or beating effect of the preturbine sufficiently heats the admission air to guarantee combustion while the preturbine is running.

When the engine reaches its maximum speed of rotation (high speed) which is recorded by the tachymetric dynamo 31 and read by the sequencer 90, the latter shuts off the air to the preturbine, whereby the crankshaft decelerates down to a low speed (of about half the top speed rating), which is again recorded by the reading means (i.e. the tachymetric dynamo 31). This new situation causes further operations of the second means (among them, the second servovalve 88 and the solenoid, valve 89) which regulates the operation of the turbocompressor 80, which leads to operational steps of the turbocompressor in the periods of time in which the crankshaft is accelerating from said low to said high speeds and these steps are alternated with other steps in which the turbocompressor is out of operation. These latter steps take place when the crankshaft is decelerating from the high to the low speed.

This acceleration and deceleration sequence is repeated as often as necessary until the crankshaft speed is maintained for a certain period of time (depending on the ambient temperature) above the low speed, during which the range of oscillation of the rotation speed is narrowed. Then the fourth regulating means (among which there are the fourth servovalve 92) operates, closing the first and second prefeed valves 40 and 42 and opening the throttle valve 44. As from that time onwards, the engine cylinders are charged with the turbocharger 18, which blows the air through the cooling radiator 20, whereby the normal running conditions of the engine 2 are finally established.

This new supply temporarily cools the inlet air, whereby the range of the rotation speed oscillations of the crankshaft increases to a certain extent, although this speed becomes stabilized after a short time. At that time, the first regulation means, namely those causing the fuel pump 50 to move to the slow running position, operates.

During the start up procedures described above, the engine 2 must be left running after each start up for sufficient time to allow the initial air pressure in the reservoir 68 to be restored.

Furthermore, the engine may be stopped manually by depressing the pushbutton 103 of the sequencer 90. This actuates the stop solenoid valve 58 and the latter actuates the stop cylinder 54 attached to the fuel pump.

Automatic start up during extended parking at low temperatures is also contemplated. In these cases, it is of interest to guarantee the availability of the start up at any time, by minimizing the amount of fuel consumed during slow running and also minimizing the the serious wear caused by the dilute sulphuric acid contained in the combustion products and which condenses in dew form on the internal surfaces of the cylinders of too cold an engine. For this purpose, the invention contemplates an automatic start up sequence described below.

The electronic sequencer 90 is provided with a selector switch 108 which, when set to the automatic position, reproduces the whole procedure described for low temperature start up, with the sole exception that the air cylinder 52 maintains the high fuel pump frequency rate, whereby the engine is kept running at a high speed until the storage reservoir 68 returns to the initial maximum pressure and the battery 30 is recharged by the current produced by the generator 28. After this, the fuel pump is stopped through the solenoid valve 58 and stop cylinder 54, whereby the engine is stopped and left ready for a repetition of the above described sequence as soon as a new drop in the engine temperature so requires.

The necessary lubrication of the internal mechanisms of the starter motor 46 and preturbine 80 is achieved by a lubricating oil mist, suspended in a current of compressed air supplied through an pneumatic OR gate, 110 or by the starter motor itself or from the turbocompressor 80 supply. This mist is generated by the spray device 104.

The water condensation in the storage reservoir 68 is driven off through the automatic purge device 72, which opens simultaneously with the operation of the starter motor 46 through the pipe 74.

A large amount of heat is lost by dissipation in detriment of the start up conditions through the materials forming the circuit leading from the turbocharger turbine 18 to the cylinders 4 (through the access pipe 84, start preturbine 80 and prefeed pipe). Thus, it is contemplated that the internal surfaces of all or part of the component parts of the said assembly should be provided with thermal insulation.

Such insulation may be provided by coating with appropriate paints, polymers or foamed materials produced with diathermal gases or by anodic oxidation of the component materials.

Figure 2:
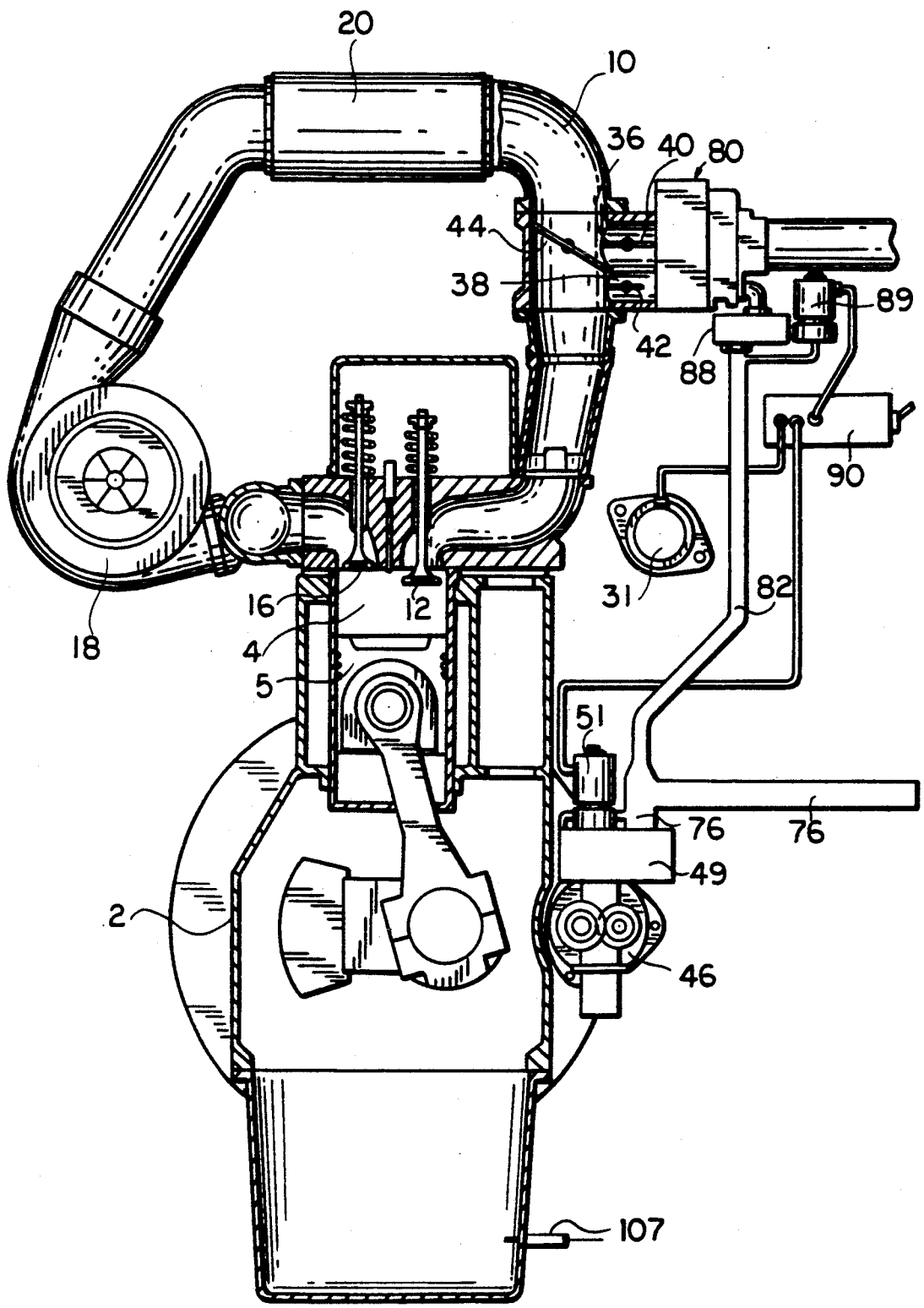
FIG. 2, is a second schematic illustration, partly in section, including a smaller number of parts than the previous Figure, relating to another embodiment of said engine.

FIG. 2 shows an embodiment containing certain differences over the one described above. The same reference numbers have been maintained in the figure for the parts substantially coincident with those of the previous embodiment described.

This second embodiment is preferably used when, as a result of the relative moderation of the low temperatures, it is not indispensable to take advantage of the inlet air temperature rise provided by the engine turbocharger 18 which, over the by-pass formed by the access pipe 84, is transmitted directly to the turbocompressor 80. Therefore, in this embodiment, the passage of the inlet air through the radiator 20 is not avoided and, as stated above, the access pipe 84 and prefeed pipe 86 are dispensed with.

Figure 3:
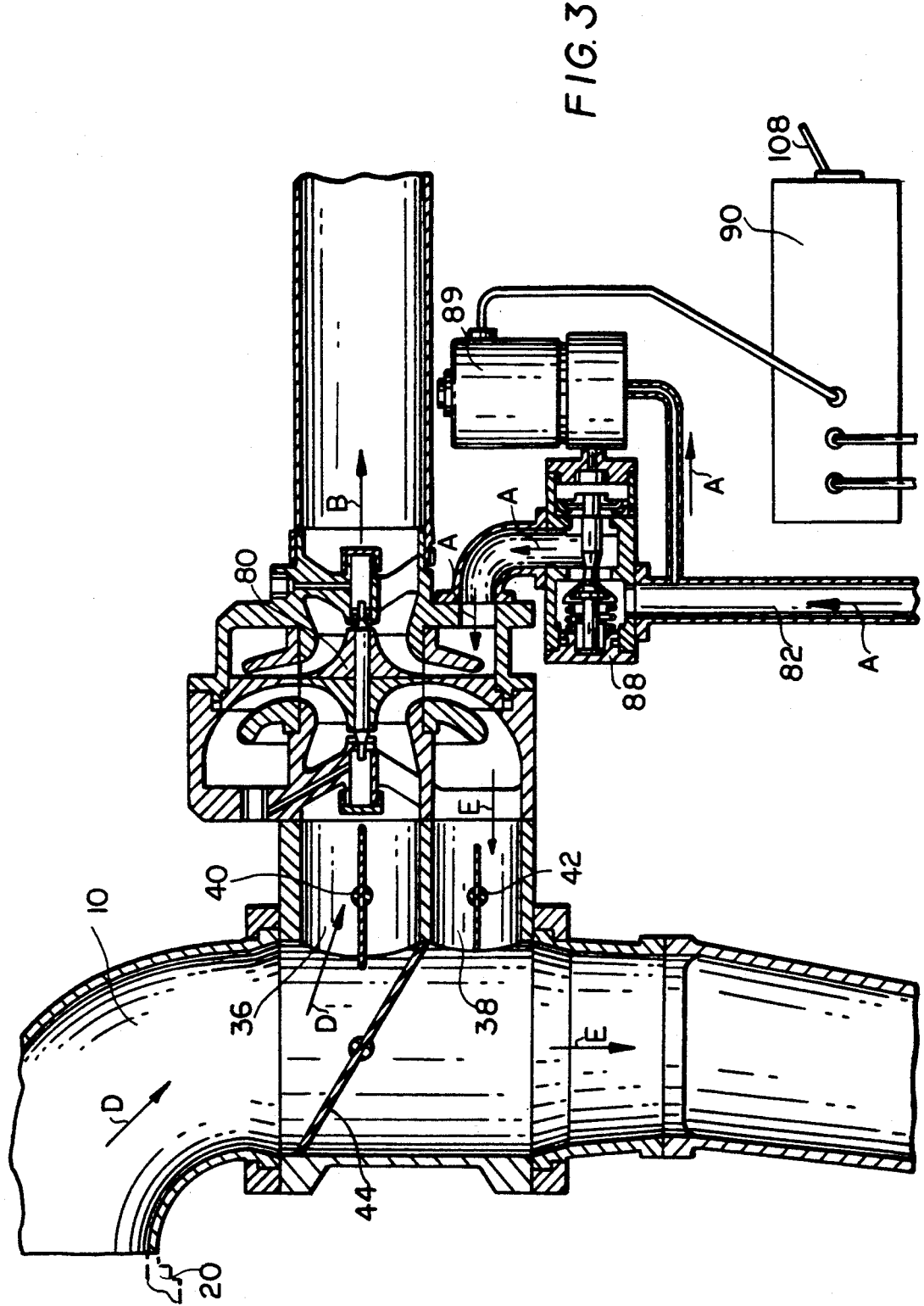
FIG. 3, on a larger scale, is a cross section of the preturbine and other members related therewith, in the arrangement adopted in the embodiment of FIG. 2.

All of this is made possible with a compact arrangement of the start turbocompressor 80 and of the valves 40, 42 and 44, as shown in FIGS. 2 and 3.

In this case, the first and second ports 36 and 38 are substantially contiguous, there being a separator means 112 therebetween. Part of the edge of the throttle valve 44, in the closed position, seats against the separator means 112, preferably formed by a wall or the like.

As in the previous case, when the preturbine 80 is running, the valve 44 is closed and the valves 40 and 42 are open and, possibly by means of a recoil spring not shown, the position of the valves is reversed when the turbine 80 stops running. Obviously the air cylinder 94 and the fourth servovalve 92 are not necessary either.

Another possible simplification of the system is the suppression of the recompressor 62 when the brake compressor 60 itself provides sufficient pressure for start up. Since this embodiment, as already stated, is deemed to be applicable preferably to less severe temperature conditions, the fully automatic operation referred to above becomes unnecessary. Consequently, the system does not include the ambient temperature sensor 98, the lubricant temperature sensor 100 and the coolant temperature sensor 102 either.

In this embodiment, it is preferred that the tachymetric dynamo 31 be driven from the end of the shaft of the compressor 60, instead of from the end of the shaft of the electric generator 28 of the engine 2.

In this case, the system contemplates a manual (or foot) control of the engine fuel. Therefore, the air cylinder 52, the stop cylinder 54 and the corresponding third solenoid valve 56 and solenoid valve 58 are unnecessary.

In turn, the stop pushbutton 103 provided in the electronic sequencer 90 is replaced in the present case by the stop button of the vehicle itself and there are only two possible positions for the selector 108: A) inactive, the the engine stopped or in normal running, and B) active, for the start up cycle.

In position B), the selector 108 connects the electronic sequencer 90 by an electric switch and supplies the pressurized air required by the air control circuit.

Figure 4:
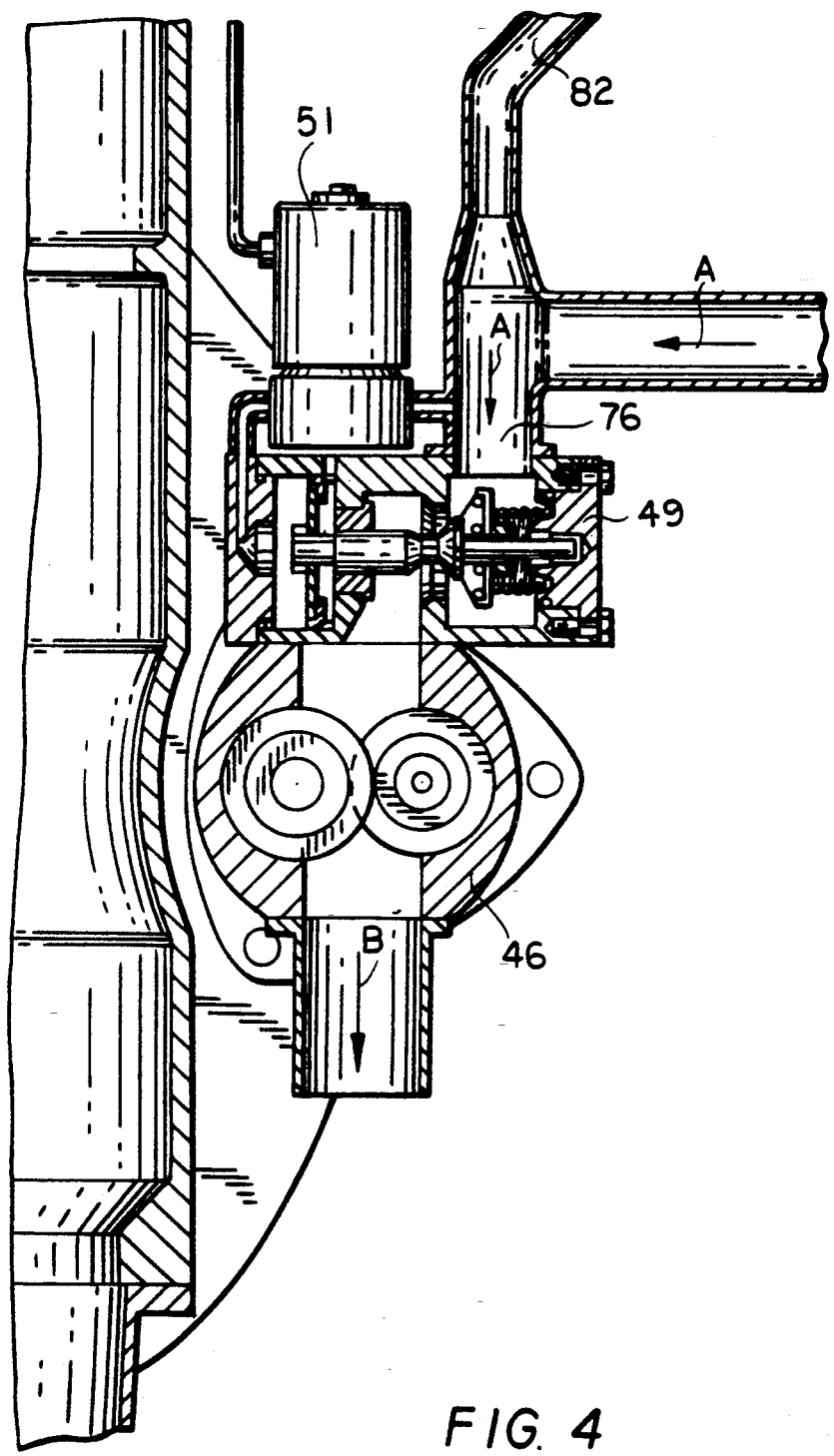
FIG. 4, on a larger scale, is a cross section of the automatic starter motor and other members related therewith.

In FIGS. 3 and 4 the arrows A indicate the pressurized air flow from the storage reservoir 68 towards respectively the start turbocompressor 80 and the air starter motor 46. The arrows B indicate the air flow exiting from said turbocompressor and said starter motor, after driving them. In turn, arrows D indicate the air flow from the turbocharger 18 while arrows E indicate the pressurized air flow exiting from the start turbocompressor 80 to start the engine 2.

A pump driven by the pressurized air provided by the turbine itself is used for lubrication of each of the turbine bearings. The metered lubricant is subsequently atomised by the low pressure compressed air provided by the turbine drive.

The purpose of this is to avoid the excess thrust that too high an air pressure would cause on the turbine bearings, at the same time as the necessary correspondence and timing is achieved between the turbine operation and the bearing lubrication.

For starting an engine in arctic conditions, not only the system described in connection with FIG. 1 might be necessary, but it is also desirable to have a pneumohydraulic converter so as completely to fill the engine lubrication circuit, by way of the starter motor 46 pressurized air, duly regulated to the desirable pressure, through what is generally called the main lubrication gallery, by suitably pressurizing it before the first compression supercharged by the turbocompressor 80 occurs in any of the engine cylinders.

The following may occur when starting engines at very low temperatures: when the engine has been running sufficiently long to reach the service temperature, the lubricant becomes sufficiently fluid to drain through the clearances of the bearings to leave the lubrication circuit completely empty when the engine is stopped.

It, thereafter, the engine is subjected to glacial weather conditions which cool it down to a temperature close to one at which the oil may no longer be pumped, it may happen at the next start up that the engine has to turn over a few dozen times before filling the lubrication circuit and establishing the required oil pressure.

In spite of the fact that the manufacturers recommend the use of prelubrication pumps, since the regularly used starting systems are not supercharged and, therefore, have low power combustion rates and rotate at low rpm, these prelubrication pumps are not fitted to the majority of land vehicles, so as not to complicate the equipment further.

On the other hand, with the supercharged feed of the present invention, it is indispensable to fill and pressurize the engine oil circuit before the turbocompressor is used and the engine reaches a speed above slow running speed.

What I claim is:

1. A low temperature starting system for internal combustion engines, comprising:
   cylinders within which a fuel may be burnt and which produces combustion gases;
   pistons, each of which is housed in one of said cylinders;

a crankshaft coupled to said pistons;

a flywheel mounted to said crankshaft;

a ring gear attached to and coaxial with said flywheel;

an air inlet manifold, said inlet manifold being coupled with said cylinders, and inlet valves regulating communication of said inlet manifold with each of said cylinders:

an exhaust manifold for said combustion gases, and said inlet manifold being coupled with each of said cylinders;

exhaust valves regulating communication of said exhaust manifold with each of said cylinders;

a turbocharger feeding said inlet manifold and being driven by said combustion gases;

a cooling radiator adapted to be inserted in said inlet manifold;

an air starter motor adapted to drive said ring gear;

means for supplying air to said air starter motor for actuation thereof;

a fuel pump adapted to reach different frequency rates; and means for reading the speed of rotation of said crankshaft, said system comprising:

a start turbocompressor drivable by air supplied by said supply means;

a first port allowing the passage of air from said inlet manifold to said start turbocompressor;

a first valve for opening and closing said first port;

a second port discharging air from said start turbocompressor to said inlet manifold towards said cylinders;

a second valve for opening and closing said port;

a throttle valve for opening and closing said inlet manifold, said throttle valve being closed when said first and second valves are open and being open when said first and second valve are closed; and regulating means adapted to receive signals from said reading means and which, in turn, comprise: first control means for said air supply means coupled with said automatic starter motor; second air supply control means coupled with said start turbocompressor; third fuel injection and, consequently, engine rotation speed control means; and fourth control means for said first and second valves and said throttle valves.

2. The system of claim 1, wherein said first and second ports are substantially contiguous, and including a separator means between said first and said second ports, and said throttle valve seating against said separator means when in its closed position.

3. The system of claim 1, wherein said first port is formed in a first portion of the inlet manifold comprised between the radiator and said turbocharger and, including an access pipe extending from said first port for placing said inlet manifold in communication with said turbocompressor and said second port being formed in a second portion of the inlet manifold comprised between said radiator and the cylinders and, a prefixed pipe extending from said second port for placing the turbocompressor in communication with the inlet manifold.

4. The system of claim 1, wherein said supply means comprises a compressor in communication with a storage reservoir, and including at least one first pipe for placing the compressor in communication with said air starter motor and at least one second pipe for placing the compressor in communication with said start turbocompressor, said pipes being respectively controlled by a first servovalve and a second servovalve.

5. The system of claim 3, wherein said control means set said fuel pump to high frequency rate at the same time as said first means allows pressurized air to flow to said starter motor, whereby said starter motor is set running and drives said crankshaft and when said crankshaft reaches a preset speed of rotation, said fourth control means closes said throttle valve and opens said first and said second by-pass valves, at the said time as said second control means allows pressurized air to flow to said start turbocompressor, which supercharges said cylinders, causing ignition of fuel, accelerating said crankshaft until it reaches a high speed which is picked up by said reading means, whereby said first control means shuts off the pressurized air flow to said starter motor, said second control means operating thereafter to shut off the air to said turbocompressor, whereby said crankshaft decelerates to a low speed which is picked up by said reading means causing further operations of the second means leading to operational steps of the turbocompressor in the periods of time in which the crankshaft is accelerating from said low to high speeds and steps in which the turbocompressor is out of operation in the intervals in which the crankshaft is decelerating from the high to the low speed until the crankshaft speed is maintained above said low speed, which reading then causes operation of said fourth regulating means to open the throttle valve and close said first and second prefeed valves, and the operation of said third control means setting said fuel pump to a slow running rate.

6. The system of claim 3, wherein said regulating means comprises an electronic sequencer provided with at least one timer and electrically connected to said reading means, with said first and second servovalves, and including a third solenoid valve associated with said fuel pump and a fourth servovalve associated with said throttle valve and said by-pass valves.

7. The system of claim 3, comprising an ambient temperature sensor, a lubricating oil temperature sensor, a coolant liquid temperature sensor and a starter motor air pressure regulator, all electrically connected with said sequencer.

8. The system of claim 3, including a spray device for generating a lubricating oil mist and an air OR gate for suspending and distributing said mist in a current of compressed air.

9. The system of claim 3, including an internal thermal insulation for at least some of the members of an assembly formed by part of the inlet manifold, the start turbocompressor, the first and second by pass valves, the throttle valve, the access pipe and the prefeed pipe.

10. The system of claim 9, wherein said thermal insulation is effected by internal coating with low thermal conductivity materials.

11. The system of claim 9, wherein said internal insulation is effected by anodic oxidation.

* * * * *